July 15, 1924.
W. O. DIXON
DUMP BED AND BODY
Filed July 9, 1923
1,501,205
2 Sheets-Sheet 1
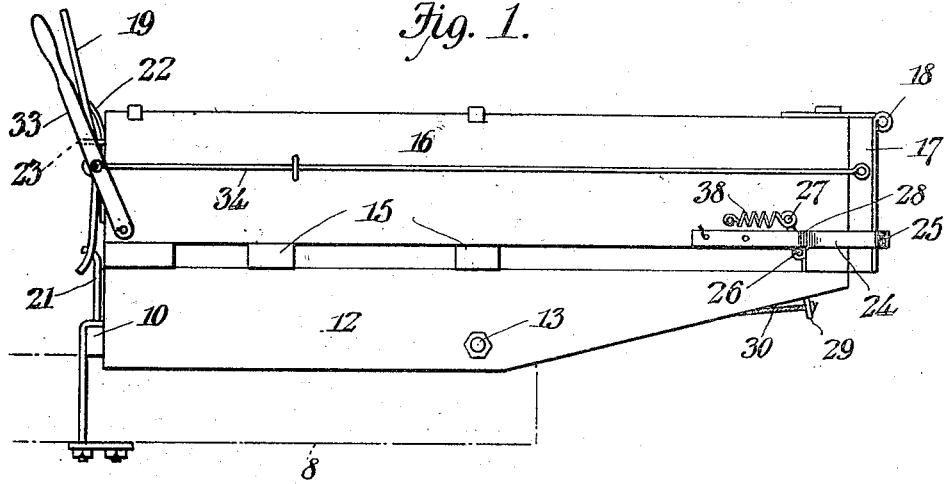
Fig. 1.
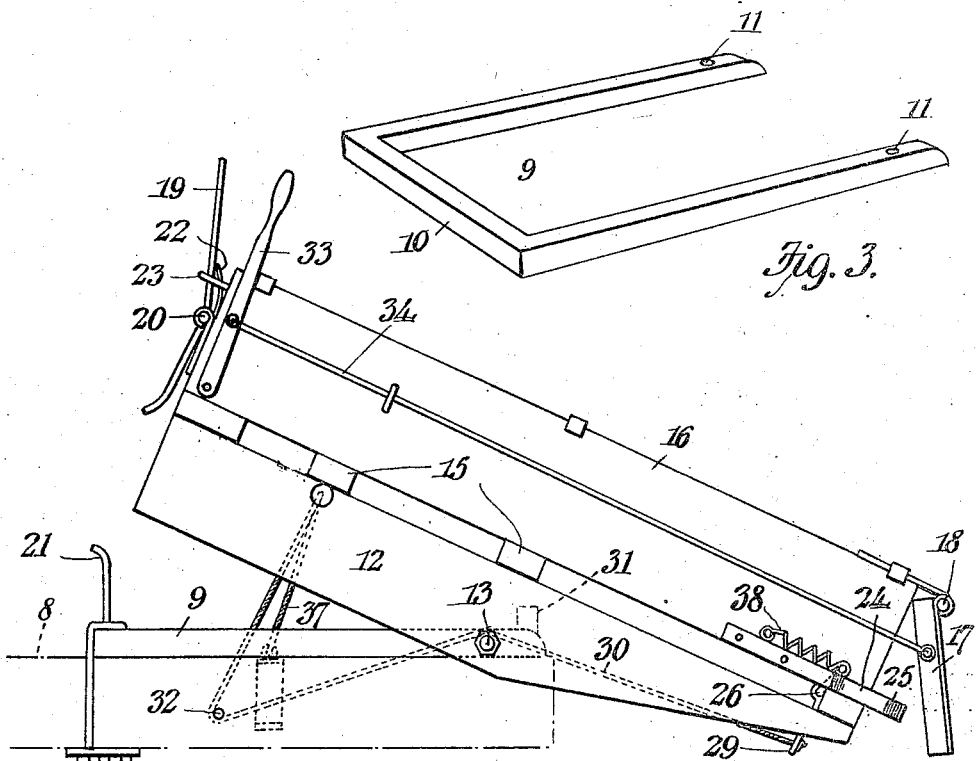
Fig. 2.
Fig. 3.
William O. Dixon, INVENTOR.
BY
ATTORNEY

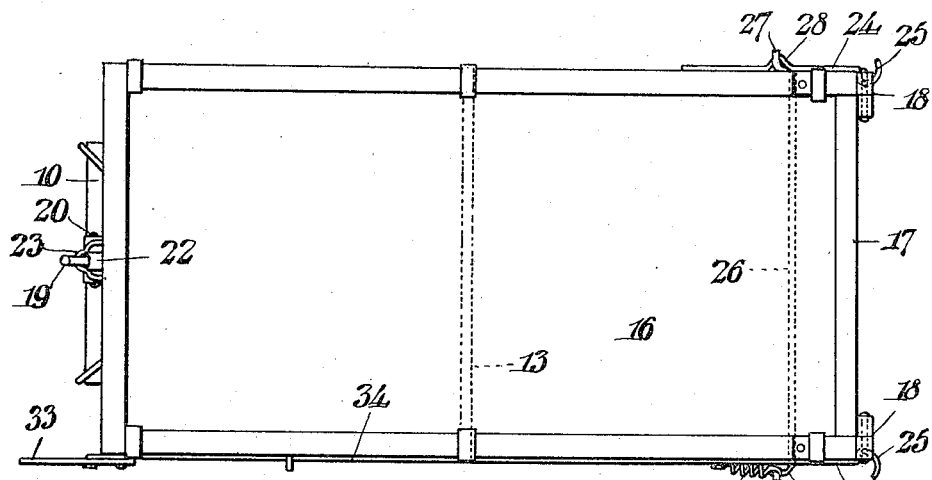
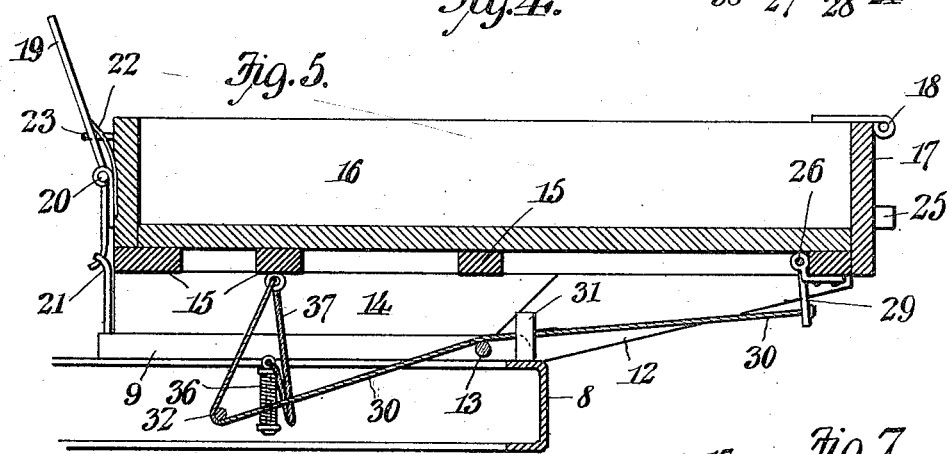
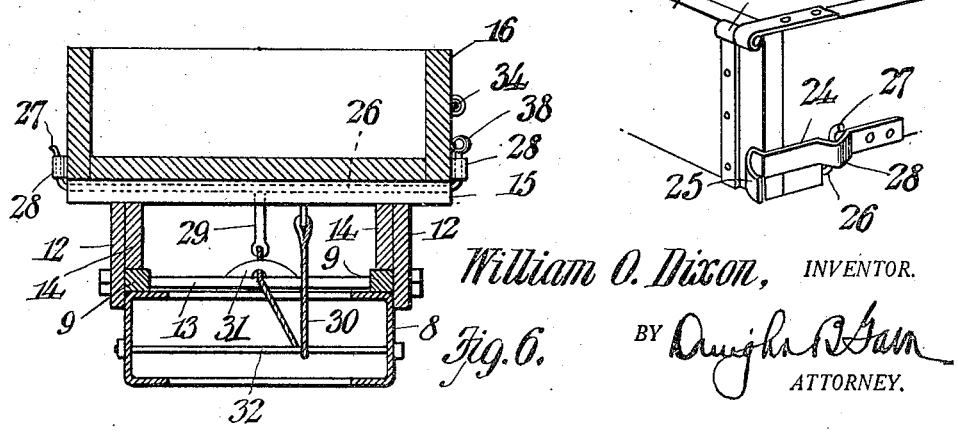

Patented July 15, 1924.

1,501,205

UNITED STATES PATENT OFFICE.

WILLIAM O. DIXON, OF DEXTER, MISSOURI.

DUMP BED AND BODY.

Application filed July 9, 1923. Serial No. 650,441.

*To all whom it may concern:*

Be it known that I, WILLIAM O. DIXON, a citizen of the United States, residing at Dexter, county of Stoddard, State of Missouri, have invented certain new and useful Improvements in Dump Beds and Bodies, of which the following is a specification.

This invention relates to dump beds and bodies for application to vehicle frames, the primary object of the invention being to provide a bed with its attached body which shall be of comparatively simple construction, practical and efficient in operation and presenting a minimum of danger of overturning in practice.

A further object of the invention is to provide a dump bed and body of such construction as to enable the same to be easily and quickly applied to a vehicle chassis without the aid of special equipment, and which involves no change in the vehicle or chassis construction for its proper application and operation.

A further object is to provide a dump body to be arranged upon the chassis in such manner as to enable the same to be operated from the driver's seat on the vehicle with but little effort or exertion on the part of the operator.

A still further object of the invention is to provide a dump body positioned upon the chassis in such manner as to properly stabilize or balance the vehicle, and wherein the weight of the load in the body is utilized in causing the body to unload itself.

With these objects in view, together with others which will appear as the description proceeds, the invention consists in the novel construction, combination and arrangement of parts, all as will be described more fully hereinafter, illustrated in the drawings, and particularly pointed out in claims.

In the drawings:

Fig. 1, is a side elevation of a bed and body constructed and applied in accordance with the invention.

Fig. 2, is a similar view showing the body in dumping position,

Fig. 3, is a detail perspective view of the bed for the body,

Fig. 4, is a top plan view of the improved body,

Fig. 5, is a longitudinal section taken through the bed and body and showing a part of the vehicle chassis.

Fig. 6, is a transverse section taken through the bed and chassis, and

Fig. 7, is a perspective view of the rear end of the body, and illustrating the gate latching device.

Referring now more particularly to the drawings, the chassis or frame of the vehicle is indicated generally at 8, and which may be of any of the approved types or models.

The device of my invention includes a bed attachable to the vehicle frame easily and quickly and without the necessity of changing or altering the frame construction and without the aid of special equipment. This bed is indicated at 9, and in the present instance comprises spaced parallel longitudinal rail or beam members to rest upon the longitudinal frame bars of the chassis or frame. These members are connected at their forward ends by the cross bar 10, and U-bolts are utilized in securing the forward part of the bed to the chassis. These bolts straddle the bars of the bed and the vehicle frame bars, and are secured in the manner shown. The rear ends of the bed bars may be fastened to the vehicle frame by passing bolts downwardly through the bars in the openings 11; the ends of the bolts entering and anchoring in the vehicle frame. The rear end of the bed terminates substantially even with the rear end of the vehicle frame, as shown.

The bed accommodates a carrier, which may be considered a part of the movable body, and this carrier comprises a pair of rails 12; one at each side of the vehicle frame. These carrier rails receive a pivot bolt 13, and the latter passes through suitable openings in the rear ends of the bed bars, thus securely holding yet pivotally supporting the carrier rails. The latter are positioned on the outside of the bed bars and also the vehicle frame, and rest snugly against the same when the carrier is in lowered or normal position. The hinge or pivot bolt 13 connects the carrier rails with the bed at a point slightly beyond the medial portions of the rails, so that the tendency of the carrier will be to assume horizontal or normal position. Each of the rails is provided upon its inner face with a bead or flange, so positioned as to rest throughout its length upon the bed when the carrier is in lowered position, whereby the weight upon the latter will be distributed over the entire lengths of the beads. This evening of the weight not only relieves the pivot bolt or pin of undue pressure but also divides the weight submitted to the vehicle frame.

The body of the dump comprises a boxlike structure secured in any approved and suitable manner upon the upper edges of the carrier rails; cross bars 15 being employed in properly anchoring this body. The body, indicated generally at 16, is of a length equal to that of the carrier bars, and is provided at its rear end with a gate 17 hinged as at 18 to the upper portions of the longitudinal bars or sides of the body, so as to swing upwardly as well as outwardly when opening. The lower end of the gate is held in closed position normally by latch mechanism to be hereinafter described in detail.

The forward end of the body 16 is equipped with latch holding mechanism to maintain the body in horizontal position under normal conditions. This latch mechanism includes a latch lever 19 pivoted intermediate its ends as at 20 in a suitable bracket on the forward end of the body, and in such position as to be easily accessible to the reach of the operator of the vehicle when seated in driving position. The lower end of this lever is broadened and apertured to engage over the upper end of the latch hook 21 on the cross bar of the bed; this engagement taking place only when the body is in lowered position. A spring member 22 holds the latch lever in such position as to snap over the latch hook automatically when the body descends, and a guide 23 on the body end straddles the lever and maintains it in proper position at all times. To aid in the automatic engagement of the lever with the latch hook, the lower end of the lever is curved outwardly, as shown.

The gate latch device comprises a spring catch for each side of the body at the rear end thereof.

Each spring member, 24, comprises a plate secured at its inner end in any suitable manner to the side of the body, while the outer end projects beyond the rear end of the body. This projecting end is provided with an inturned portion constituting a gripping finger 25, to engage with the outer face of the tail gate 17 when the latter is in closed position and to tightly clamp the latter. The extreme outer portions of these spring clamp members are turned outwardly as shown, to allow the gate to easily pass by and snap within the spring fingers when the gate moves to closed position.

In connection with the invention, I provide means of an automatic nature for causing the gate to be released when the body dumps. This means operates as a result of the body moving to dumping position, and includes a rock bar 26 arranged transversely beneath the body near the rear end thereof, and provided at each end with upstanding arms 27 at its extremities. These arms lie beyond the edges of the body and within raised portions 28 in the spring plates 24. When in true upright position, the arms are bridged by the raised portions 28, but movement of the arms rearwardly causes the arms to engage the sides of the raised portions and move the spring members 24 outwardly sufficiently far to cause the fingers 25 to disengage from the tail gate 17.

The rock bar 26 is provided inwardly from its ends with a downwardly extending finger 29, to which the rear end of a flexible connector 30, such as a cable, chain or the like, is attached. This connector passes forwardly beneath the body and throught a block 31 on the chassis and around a bar 32 on the chassis near the forward end of the dump body. The cable or connector then passes upwardly and is secured to the under portion of the dump body near the forward end of the latter.

The construction and arrangement is such that when it is desired to dump the body it is but necessary to move the lever 19 rearwardly sufficiently to release the latch from the catch post 21, whereupon the body will tilt rearwardly upon its pivot bar 13. The body is so balanced upon the bed that this action will take place without effort on the part of the operator other than releasing the latch. As the body tilts rearwardly, the inner end of the tail gate releasing cable is elevated, causing the cable to be shortened and creating inward pressure upon the finger 29. This rocking of the bar 26 throws the arms 27 outwardly, moving the outer ends of the spring catches outwardly to release the tail gate. The gate thus released will open, due partly to gravity and partly to pressure of the contents of the body upon the gate, and the load will be allowed to flow out of the rear end of the body.

To reset the body, it is but necessary for the operator of the vehicle to depress the forward end of the body, which, by reason of the proper balance, may be easily done, until the latch at the forward end of the body becomes caught. The gate swings inwardly toward normal position and may be held against complete closing by engagement with the catch members 25, which have assumed normal position. To force the gate to closed position, a lever 33 is pivoted to the body near the forward end thereof and in position for easy reach of the operator from the driver's seat, and this lever is connected to the gate 17 by a link 34. Forward movement of this lever will, obviously, force the gate past the resilient catch members 25, whereupon the latter will snap over and properly hold the gate in closed position.

One, or both, of the arms 27 has attached thereto one end of a contractile spring 38; the opposite end thereof being secured to the dump body forwardly of the gate. This spring tends to draw the arm forwardly and to cause the same to lie beneath the raised portion of the spring catch member, whereupon the latter may assume normal position. However, this action can take place only when the operating cable 30 is relaxed, as in the resetting operation.

It is customary in devices of this kind to employ snubbers to limit the tilting action of the dump body, and I have illustrated a conventional form of snubber including the spring 36 attached to some fixed part of the vehicle structure. The spring has attached thereto one end of a cable 37, of proper length, secured at its opposite end to the forward part of the dump body. The snubbers come into operation immediately when the body has assumed such position of angularity to enable the contents thereof to slide freely out the rear end of the body, thus releasing the load properly and preventing violent shocks or jars to the body, bed or chassis.

By arranging the dump body in the manner shown and described, it is apparent that all the operations of the dump body may be controlled from the seat of the operator of the vehicle, whereby dangers of injuries to the operator or helpers are obviated. By mounting the body in the manner disclosed, these operations may be carried out with but little effort and exertion, and in practice the load in the body assists in stabilizing the body and the vehicle, and contributes to the proper unloading operations.

The attachment in its entirety is of such construction that it may be easily and quickly applied to the chassis of vehicles now in use without necessitating any changes or alterations in the chassis construction. The side bars 12 of the carriage maintain the body rigid against lateral thrusts, by reason of their snug engagement at all times with the sides of the vehicle frame and the longitudinal rails of the dump bed.

For convenience in description and illustration I have shown the invention carried forth with a bed and body constructed of wood, however, it is obvious that the invention is not limited in practice with such materials, as equally as satisfactory, if not better, results may be obtained by constructing the parts of wood or metal in combination, or entirely of metal.

Furthermore, it will be understood that the invention is not necessarily limited to the precise construction set forth and shown, as changes in the minor details of construction and arrangement of parts may be freely resorted to without departing from the spirit of the invention as defined by the claims.

I claim:

1. In a device of the class described, a body, a gate hinged to said body, spring clamp plates attached to said body and projecting beyond the end thereof, inturned fingers at the free ends of said plates adapted to engage behind said gate when the latter is in closed position, outwardly bent portions on said plates, a rock lever on said body, arms on said lever normally resting beneath said bent portions, and means for rocking said lever.

2. In a device of the class described, a tiltable body, a gate hinged to said body, inwardly springing clamp plates attached to the body and projecting beyond the end thereof one at each end of said gate, inturned fingers at the free ends of said plates to engage behind said gate when the latter is in closed position, outwardly inclined surfaces on each of said plates inwardly from the ends thereof, a rock shaft on said body, arms projecting from said shaft, the said inclined portions of the plates being disposed in the path of movement of the said arms when the latter travel in one direction, a spring connecting one of said arms with said body, and means for moving said shaft.

In testimony whereof I affix my signature hereto.

WILLIAM O. DIXON.